A. S. KROTZ.
TRACTOR WHEEL.
APPLICATION FILED JAN. 5, 1920.
1,437,849.
Patented Dec. 5, 1922.
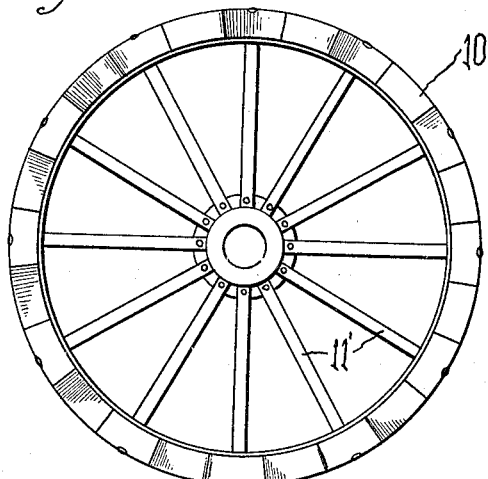
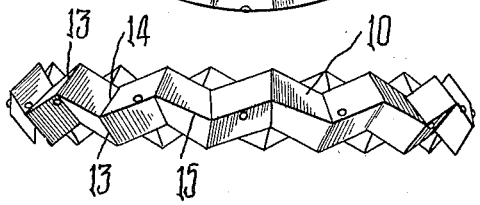
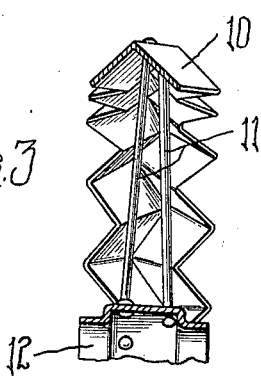
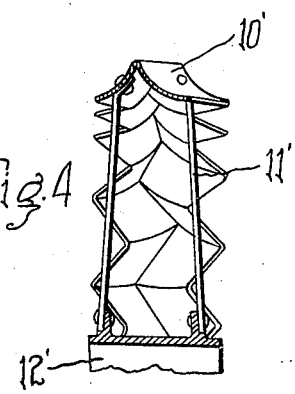
Inventor
Alvaro S. Krotz
By Attorneys
Blackmore, Spencer & Flint.

Patented Dec. 5, 1922.

1,437,849

UNITED STATES PATENT OFFICE.

ALVARO S. KROTZ, OF JANESVILLE, WISCONSIN, ASSIGNOR TO GENERAL MOTORS CORPORATION, OF DETROIT, MICHIGAN, A CORPORATION OF DELAWARE.

TRACTOR WHEEL.

Application filed January 5, 1920. Serial No. 349,597.

*To all whom it may concern:*

Be it known that I, ALVARO S. KROTZ, a citizen of the United States, and a resident of Janesville, county of Rock, and State of Wisconsin, have invented certain new and useful Improvements in Tractor Wheels, of which the following is a full, clear, concise, and exact description, such as will enable others skilled in the art to which the invention relates to make and use the same, reference being made therein to the accompanying drawings, which form a part of this specification.

The invention relates to vehicle wheels and more particularly to those of the type employed in connection with farm tractors. It is advantageous in machines of this character to provide the wheels through which tractive effort is exerted with ground-engaging means whereby slipping of the wheel in the direction of travel may be prevented and also whereby sidewise slipping or skidding may be avoided, and to this end various forms of wheels and traction elements therefor have been devised.

It is the primary object of my invention to provide a new and improved construction whereby the grip of the wheel upon the ground surface will be greatly increased. It is a further object of my invention to provide a wheel in which the rim member shall be so shaped as to prevent slipping both in the direction of travel and laterally. It is a further object of my invention to provide in a tractor wheel construction a rim of a unitary piece of metal so shaped as to provide ground-engaging means of highly efficient design and also to afford great strength and durability.

With the above and other objects in view as will hereinafter more fully appear, the invention comprises a wheel having a rim portion composed of a sheet or bar of metal bent or otherwise shaped to angular form and having parts laterally deflected so as to provide gripping or ground-engaging surfaces to obviate both circumferential and lateral slipping of the wheel. The invention further comprises various details of construction all as hereinafter more fully described and claimed.

In the accompanying drawings:

Fig. 1 is an elevation of a tractor wheel showing one embodiment of my invention.

Fig. 2 is a plan view of the wheel shown in Fig. 1;

Fig. 3 is a partial section of the same form of wheel, taken in a radial plane, and Fig. 4 is a similar view of a slightly modified wheel.

Referring to the drawing 10 indicates a rim portion constituted by an angle-bar having a cross-section of approximately the contour of a flattened V, the apex or corner of the angle being directed outwardly. It will be understood that this rim portion may be attached in any suitable manner to a wheel or rim of conventional design. I prefer, however, to utilize the bar itself as the rim proper of the wheel as shown in the drawing. In this construction the spokes will be attached directly to the angle-bar. These spokes may be of circular cross-section as shown at 11, or they may be of flat bars as indicated at 11'. In either case the spokes will be suitably secured to the rim as by riveting. The inner ends of the spokes will be attached in any desired manner to a hub 12, which latter may be of any suitable character.

The cross-section of the angle-bar may be varied considerably. In the form shown in Figs. 1 to 3 the two faces of the bar are represented as flat and as meeting at an obtuse angle. In Fig. 4, on the other hand, the faces of the bar 10' are shown as concave, and the meeting angle is relatively more acute, thereby enabling the apex of the bar to more readily obtain a grip upon the ground surface. Various other forms of angle bars may be employed if desired, and I do not consider my invention as in any way limited to the forms described.

Furthermore, the angle-bars may be arranged in various ways provided that in any case some corner or flange shall be directed outwardly so as to engage the ground.

In order to provide the ground-gripping surfaces to which reference has been made, I propose to distort the angle-bar laterally so as to form deflected portions in which the line of the apex or outwardly directed flange or portion of the bar will lie at an angle to the circumference and hence to the path of the wheel. Obviously, by this construction the faces of the angle-bar are disposed obliquely of the path of the wheel sufficiently to provide gripping means for tractive engagement with the ground. In the preferred embodiment of my invention I shape the rim by bending or pressing the faces of the angle-bar into corrugated or fluted form whereby the apex or corner of the bar will be disposed in a zigzag line circumferentially of the wheel and successive portions will lie alternately upon opposite sides of the central plane of the wheel. As shown in the drawing, the indentations or depressions 14 on one face of the bar are in register transversely with the ridges 13 on the other face, thus producing a zigzag appearance of the entire bar. It will be seen that the meeting edge 15 of the two faces will not only be in a zigzag line but will lie at a uniform distance from the axis, thereby providing an initial ground-engaging portion affording a rolling contact with a hard surfaced roadway which avoids the bumping effect resulting from the use of many common forms of traction elements. Furthermore, the supporting surface in soft soil comprises a continuous circumferential band of considerable width, namely the rim portion between the planes passing through the inner vertices of the notches formed in the edge of the wheel by indentations 15, between which planes, and departing only slightly from the central plane of the wheel, the zigzag line of the edge 15 lies, thus presenting continuous support substantially centrally of the wheel and obviating lateral strains therein.

It is obvious that the bends or distortions of the bar may be made more or less abrupt or acute. The drawing shows the successive portions of the bar all meeting at sharply defined angles as at 13 or 14, but such meeting edges may be made rounded or curved to a greater or less extent.

It will be seen that the construction described results in the provision of gripping surfaces operative in the direction of travel of the wheel and also similar surfaces presented laterally of the direction of travel whereby I not only facilitate the exertion of tractive effort but also prevent side slipping or skidding. Furthermore, I accomplish these results with a structure which is both simple and extremely rigid. It will be noted also that the rim structure described will not clog or gather mud in the manner common with many traction wheels for the reason that the indentations are directed upwardly and outwardly from the point of engagement with the ground and hence tend to clear themselves of any accumulation of sticky material.

While I have described the rim portion as being formed by bending or pressing an angle bar it will be obvious that it may readily be cast if desired or produced in any other suitable manner.

It will be understood that various changes may be made in details of construction without departing from the spirit and scope of the invention as set forth in the appended claims and therefore I do not wish to be limited to the specific structures herein described.

I claim:

1. In a wheel for tractors or the like, a metal rim portion substantially V-shaped in cross-section with the apex outwardly directed and arranged in a zigzag line circumferentially of the wheel at a uniform distance from the wheel axis, the said portion presenting a continuous circumferential supporting band on both sides of the central vertical plane of the wheel, the side faces of said rim being deflected laterally back and forth to form alternate indentations and ridges whereby said supporting band presents gripping faces oblique to the path of the wheel.

2. A fabricated vehicle wheel comprising a hub, a sheet metal rim formed of a V-shaped angle bar having its apex outwardly directed and its faces bent to form alternate indentations and ridges, said rim presenting a continuous circumferential supporting band of substantial width, said apex forming a zigzag line at a uniform distance from the hub and lying within said band, and spokes connecting and secured to said hub and rim.

In testimony whereof I affix my signature.

ALVARO S. KROTZ.